United States Patent [19]
Zimmer

[11] Patent Number: 5,842,145
[45] Date of Patent: Nov. 24, 1998

[54] APPARATUS FOR PROVIDING INDIVIDUALIZED MAPS TO PEDESTRIANS

[76] Inventor: John S. Zimmer, 413 S. Ellison La., Waynesboro, Va. 22980

[21] Appl. No.: 678,580

[22] Filed: Jul. 8, 1996

[51] Int. Cl.⁶ .................................................. G01C 21/00
[52] U.S. Cl. ........................................... 701/201; 340/944
[58] Field of Search .................................. 701/200, 201; 340/944

[56] References Cited

U.S. PATENT DOCUMENTS

| Re. 32,115 | 4/1986 | Lockwood et al. | 235/381 |
|---|---|---|---|
| 4,817,043 | 3/1989 | Brown | 364/518 |
| 4,974,170 | 11/1990 | Bouve et al. | 364/518 |
| 5,289,572 | 2/1994 | Yano et al. | 395/155 |
| 5,559,707 | 9/1996 | Delorme et al. | 364/443 |

*Primary Examiner*—Michael Zanelli
*Attorney, Agent, or Firm*—Norman B. Rainer

[57] ABSTRACT

Apparatus for producing a map to be carried by a pedestrian for guidance to a personally selected destination within a region of pedestrian traffic includes a memory storage unit interactive with a display unit, user-operable infeed unit, and data processor unit. The data processor unit determines an appropriate walking path to be taken to arrive at the selected destination. A printing unit prints and dispenses to the user an individualized map indicating the appropriate path determined by the data processor unit in accordance with selections entered by the user into the infeed unit.

8 Claims, 3 Drawing Sheets

APPARATUS FOR PROVIDING INDIVIDUALIZED MAPS TO PEDESTRIANS

BACKGROUND OF THE INVENTION

1. Field of the Invention

This invention concerns apparatus for generating a map to be carried by a pedestrian for guidance to a personally selected destination.

2. Description of the Prior Art

In large metropolitan airports, it is often very confusing for most travelers to ascertain where they should be going and how to get there. For example, upon arriving on one flight, and having to find a connecting flight at the same airport, the traveler must ascertain what departure gate he must find, and then learn how to get to that gate. Other often-sought locations in an airport include: baggage claim, ground transportation, customs and immigration services, money exchange, car rental, first aid, waiting lounge, restaurants, rest rooms, telephones and ticket counter. Because the particular airport is often unfamiliar, the traveler, usually in a hurry and burdened with luggage, must ask others for directional information. Such information may not be accurate, causing lost time and consuming considerable effort.

Similar dilemmas confront pedestrians in other travel centers such as train and bus terminals, shopping malls and large commercial and governmental building complexes. In many such situations directional and informational signs may be variously located. However, between such signs there is no continuum of guidance. A simple overall map of an airport or building complex is certainly helpful, but the hurried traveler may not be able to quickly ascertain his location and orientation on the map and the best path to travel to arrive at the particular place he seeks.

Numerous navigational, mapping and locator systems are disclosed in the prior art. Most such systems are, however, intended for use with aircraft, boats or automotive vehicles. For example, U.S. Pat. No. 5,184,303 to Link discloses a vehicle route planning system for calculating a desired route between start and destination locations. The Link system involves electronic components that produce a route image on a CRT display, said route being determined by input information interactive with fixed road path data stored in memory.

U.S. Pat. No. 5,170,165 to Ihoski et. al. concerns apparatus for indicating on a screen the travel path and current position of an automobile running on a selected road in a road map appearing on an associated screen.

U.S. Pat. No. 5,289,572 to Yano et. al. concerns a system which provides a CRT or LCD display having travel directions to and descriptive information about service facilities such as hotels and restaurants.

U.S. Pat. No. 3,961,435 to Keckler concerns apparatus comprised of illuminated panels intended to assist a user in finding specific merchandise in a large store. When the user presses a button corresponding to the sought item of merchandise, a light appears at the appropriate location in a floor plan of the store appearing in said panels.

Although said prior disclosures provide various improvements in navigational, mapping and locator systems, they do not teach or suggest means for enabling a pedestrian to find his way through maze-like buildings with continuous guidance throughout his journey.

It is accordingly an object of the present invention to provide stationary apparatus for providing to a pedestrian user a printed map showing the path to be taken to arrive at a sought destination.

It is another object of this invention to provide apparatus of the aforesaid nature wherein said printed map is printed in response to input destination information entered into the apparatus by said user.

These objects and other objects and advantages of the invention will be apparent from the following description.

SUMMARY OF THE INVENTION

The above and other beneficial objects and advantages are accomplished in accordance with the present invention by apparatus for providing an individualized map to a pedestrian comprising:

a) a memory storage unit provided with a generalized detailed map of a region of pedestrian traffic indicating locations of walkways and destinations, b) a display unit for providing operating instructions, destination choices, and map information, c) a user-operable infeed unit which receives selection information relative to a destination contained by said generalized map, d) a data processor unit which determines the appropriate walking path to be taken to arrive at said selected destination, and e) a printing unit which prints and dispenses to the user an individualized map indicating the appropriate path determined by said data processor unit.

In preferred embodiments, an updating memory unit supplies the data processor with transient current information concerning destinations, and further supplies means for ascertaining destinations based upon limited input by the user. For example, in the case of an air travel passenger who knows only the airline name, flight number, city destination or estimated departure time of a connecting flight, the apparatus would be capable of determining the departure gate.

BRIEF DESCRIPTION OF THE DRAWING

For a fuller understanding of the nature and objects of the invention, reference should be had to the following detailed description taken in connection with the accompanying drawing forming a part of this specification.

DESCRIPTION OF THE PREFERRED EMBODIMENT

Figure 1:
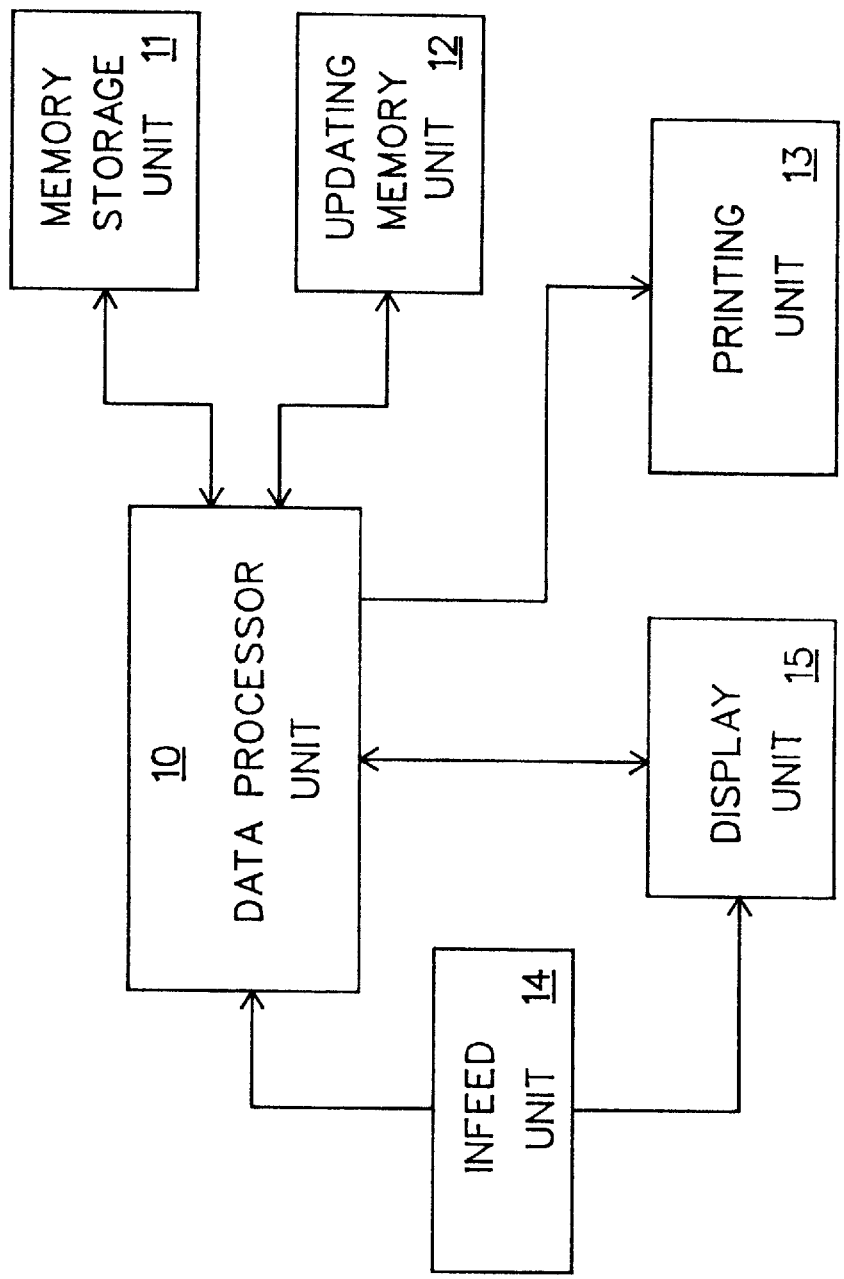
FIG. 1 is a block diagram of a preferred embodiment of the apparatus of the present invention.

Referring to FIG. 1, an embodiment of the apparatus of the present invention is shown comprised of data processor unit 10 interactive with memory storage unit 11, updating memory unit 12, printing unit 13, infeed unit 14 and display unit 15.

Infeed unit 14, interactive between data processor 10 and display unit 15, may be a keyboard, voice-activated module, or pressure-sensitive or infra-red sensing touch pad system.

Display unit 15, interactive between infeed unit 14 and data processor unit 10, may be a multi-color cathode ray tube (CRT) or light-emitting diode system (LED).

Printing unit 13 may utilize an inkjet or laserjet principle. A suitable laserjet-type printing unit is Hewlett Packard Laserjet 4M Plus, which can print 12 pages/minute at 600 dpi resolution with a memory of 26 MB, and 45 scalable typefaces. Printing unit 13 preferably has multi-color capabilities.

Memory storage unit 11 and updating memory unit 12 may be incorporated with data processor unit 10 as in commercially available computer systems. A suitable computer system, for example, is Maxum model 486DX2-66 MHz Multimedia. Its features include: 66 MHz 486DX2 CPV; 8 MB RAM, 128 KB Cache; 424 MB 13 ms IDE Hard Drive; 3.5" 1.44 MB Disk Drive. Memory storage unit 11 holds a fixed map and route configuration corresponding to each destination selected by the user.

In operation, the user will enter into infeed unit 14 an alpha-numeric code corresponding to a destination appearing either on a menu in display unit 15 or on a fixed signboard adjacent the apparatus. Data processing unit 10 selects the corresponding fixed map and route configuration, and activates printing unit 13 to produce a paper copy to be taken by the user.

In situations where the user does not know his destination, he will enter relevant information such as: airline name, flight number, or type of product or service sought. Updating memory unit 12 will process such information in conjunction with data processor unit 10 to determine the destination, and the appropriate corresponding map/route will be printed.

Figure 2A:
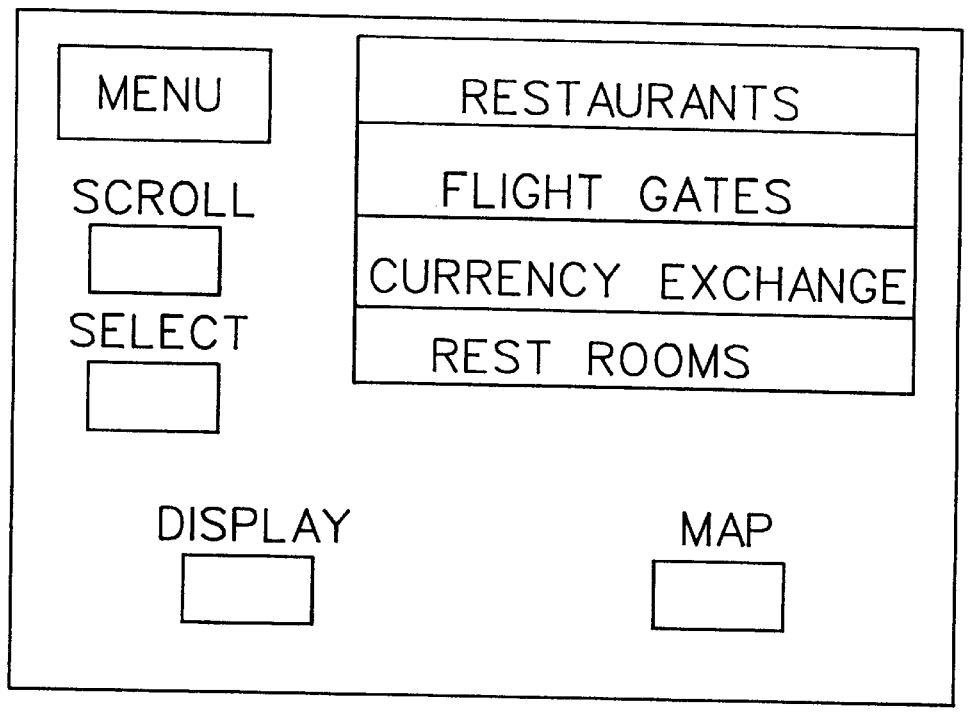
FIGS. 2A and 2B are examples of displays appearing on the display unit of the apparatus of FIG. 1.
Figure 2B:
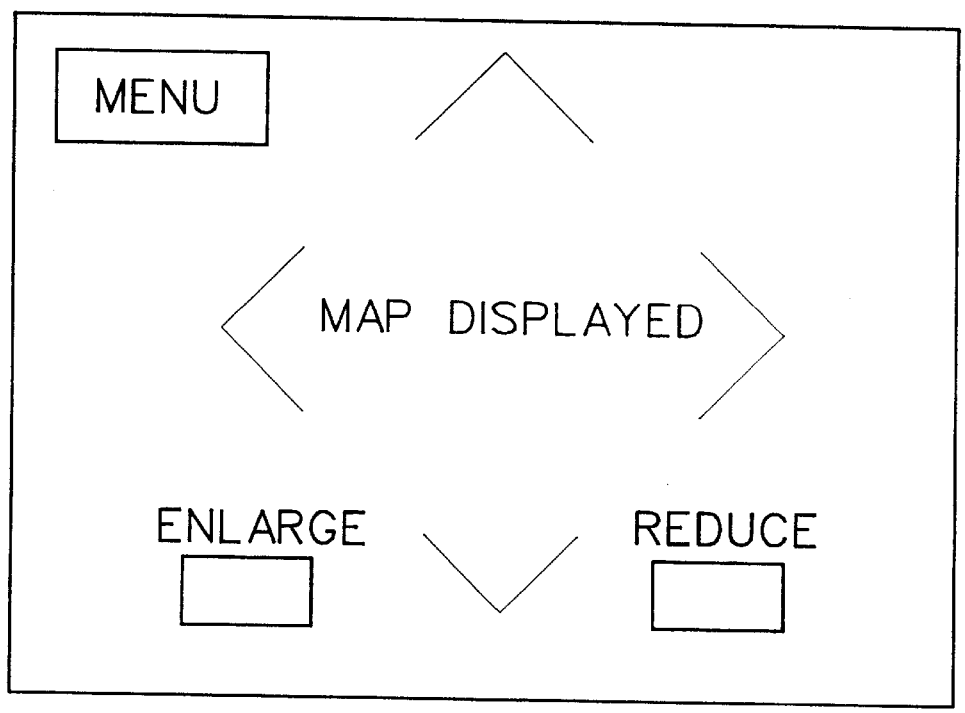

To assist the user in determining his destination, displays such as those shown in FIGS. 2A and 2B may appear on display unit 15.

Figure 3:
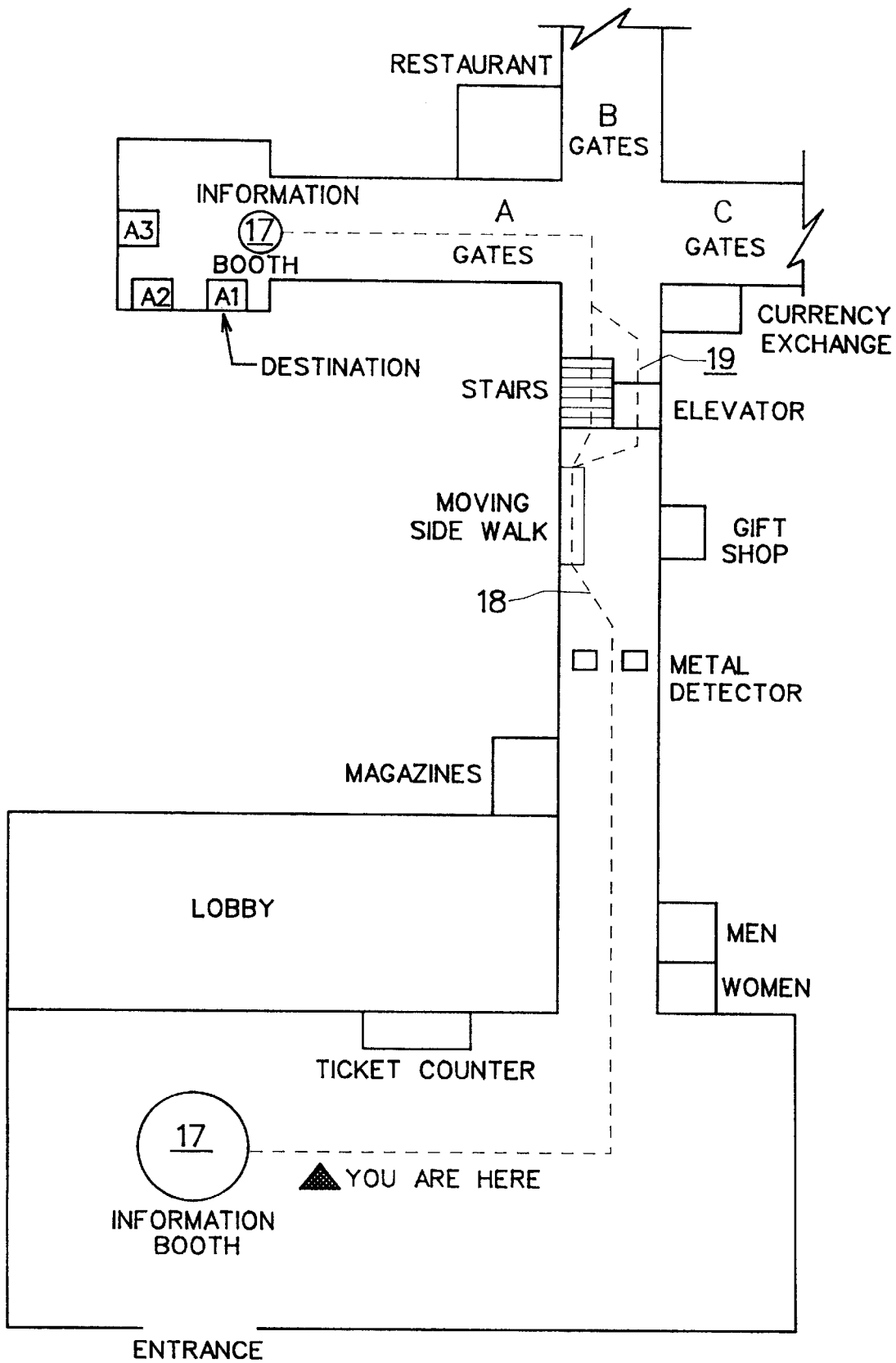
FIG. 3 illustrates a typical map produced by the apparatus of this invention.

FIG. 3 illustrates a typical map produced by the apparatus 17 of this invention. The map indicates a broken line path 18 that extends from the location of the apparatus, referred to as "info booth," to a sought destination. The map further depicts various features along path 18 to provide more assured guidance to the map-carrying traveler. Optional alternate path 19 is shown to illustrate a specific situation wherein a traveler with a baggage car will prefer an elevator to a flight of stairs. The presentation of alternative paths is particularly useful where the chosen destination is not mandated by a predetermined travel itinerary, but is merely preferred, as in sight-seeing regions of pedestrians traffic such as outdoor historic sites, zoos, theme parks and amusement parks.

In an alternative embodiment of the present invention, preprinted maps are stored in kiosk-type dispensing structures located at strategic sites within a region of pedestrian traffic. Such embodiment, however, is practical only in relatively simple regions of pedestrian traffic having a limited number of possible destinations. Accordingly, a relatively small number of preprinted maps are needed.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. Apparatus for providing an individualized map to an airport pedestrian comprising:

a) a memory storage unit provided with a generalized detailed map of said airport indicating locations of walkways and destinations, b) a display unit for providing operating instructions, destination choices, and map information, c) a user-operable infeed unit which receives selection information relative to a destination contained by said generalized map, d) a data processor unit which determines the appropriate walking path to be taken to arrive at said selected destination, e) an updating memory unit which supplies said data processor with transient current information concerning destinations, departure gate, flight time and flight number, and further supplies means for ascertaining departure gate based upon limited input by the user, and f) a printing unit which prints and dispenses to the user an individualized map indicating the appropriate path determined by said data processor unit.

2. The apparatus of claim 1 wherein said infeed unit is a keyboard.

3. The apparatus of claim 1 wherein said infeed unit is a pressure-sensitive touch pad.

4. The apparatus of claim 1 wherein said infeed unit is an infra-red sensing touch pad.

5. The apparatus of claim 1 wherein said display unit is a multi-color cathode ray tube.

6. The apparatus of claim 1 wherein said display unit is a light-emitting diode system.

7. The apparatus of claim 1 wherein said printing unit is a multi-color printer.

8. The apparatus of claim 1 wherein said printing unit is a laserjet-type printer.

\* \* \* \* \*